(No Model.) 2 Sheets—Sheet 1.

W. N. HILL.

PROCESS OF AND APPARATUS FOR THE PRODUCTION OF NITRO GLYCERINE.

No. 262,769. Patented Aug. 15, 1882.

Witnesses:
E. A. Hemmenway
Walter E. Lombard

Inventor:
Walter N. Hill
by N. C. Lombard
Attorney.

(No Model.) 2 Sheets—Sheet 2.

W. N. HILL.

PROCESS OF AND APPARATUS FOR THE PRODUCTION OF NITRO GLYCERINE.

No. 262,769. Patented Aug. 15, 1882.

Witnesses:
E. A. Hemmenway
Walter E. Lombard

Inventor:
Walter N. Hill
by N. C. Lombard
Attorney.

UNITED STATES PATENT OFFICE.

WALTER N. HILL, OF NEWPORT, RHODE ISLAND.

PROCESS OF AND APPARATUS FOR THE PRODUCTION OF NITRO-GLYCERINE.

SPECIFICATION forming part of Letters Patent No. 262,769, dated August 15, 1882.

Application filed June 6, 1881. (No model.)

*To all whom it may concern:*

Be it known that I, WALTER N. HILL, of Newport, in the county of Newport and State of Rhode Island, have invented certain new and useful Improvements in Processes of and Apparatus for the Production of Nitro-Glycerine, of which the following, taken in connection with the accompanying drawings, is a specification.

My invention relates to an improved process of and apparatus for manufacturing nitro-glycerine, whereby the operation is rendered continuous and much more expeditious and effective than heretofore; and it consists in the process of continuously producing nitro-glycerine by mixing glycerine with a portion only of the acid required for its conversion into nitro-glycerine, allowing reaction to take place with the aid of air or mechanical agitation, passing the partially-converted mixture into another and larger vessel, and adding the necessary additional quantity of acid to complete the conversion.

It further consists in the combination of two reaction-vessels of different capacities connected by a suitable pipe, two acid-supply tanks, each connected by a suitable pipe with one of said reaction-vessels, and a glycerine-supply tank connected with one of said reaction-vessels in such a manner that a constant supply of glycerine will be furnished to one of said reaction-vessels and a constant supply of acid will be furnished to both of said vessels.

It further consists in the combination of two acid-tanks, two reaction or mixing vessels of different capacities connected together and to the acid-tanks by suitable pipes, a separating-tank connected by a pipe with the second or larger reaction-vessel, a nitro-glycerine receiver connected by a pipe with said separating-tank near its upper end, and a spent-acid receiver connected by a pipe to said separating-tank near its bottom.

Figure 1:
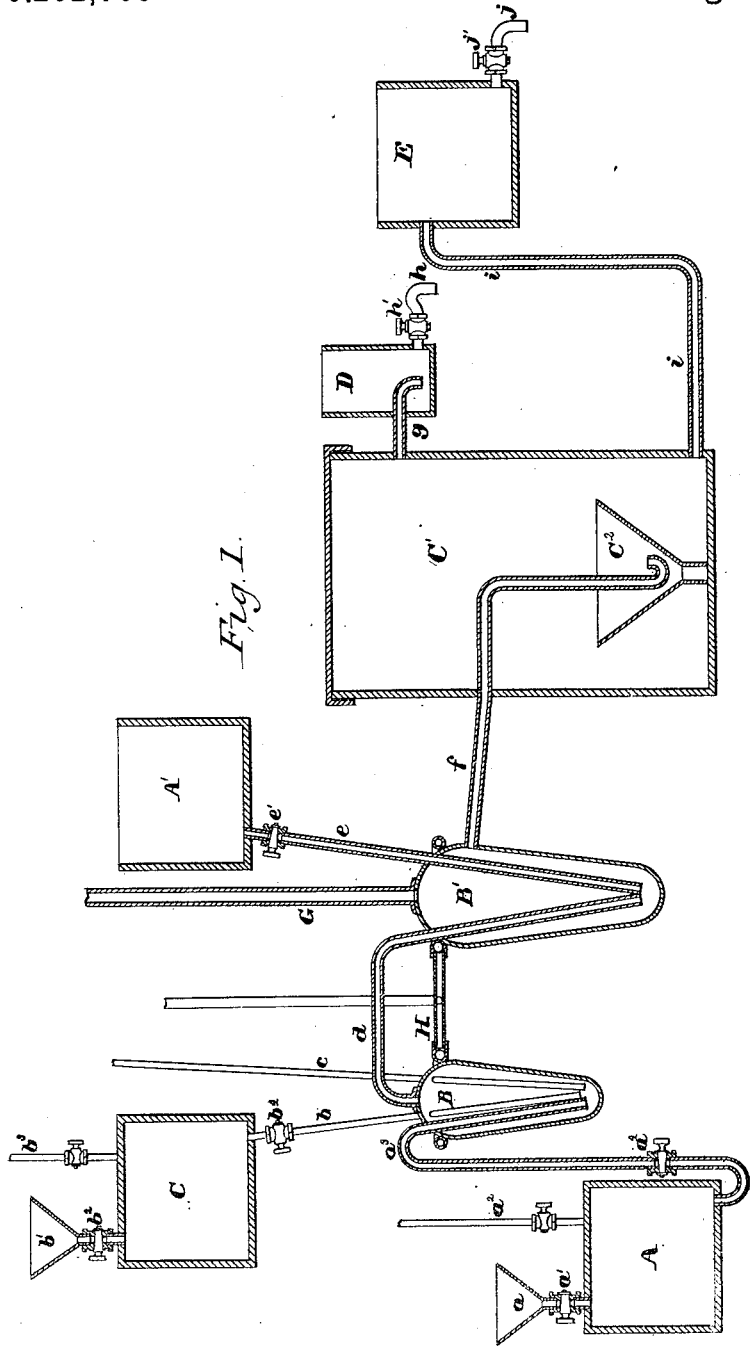
Figure 2:
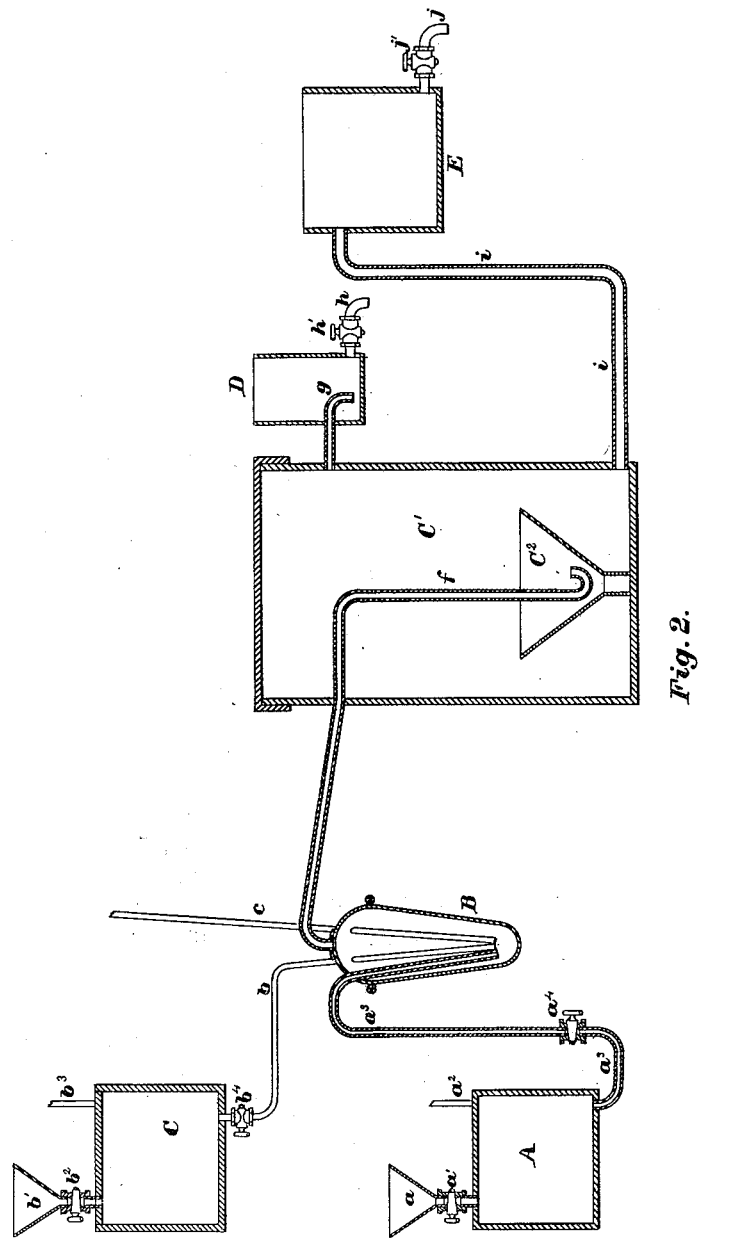

In the accompanying drawings, Figure 1 is a vertical longitudinal section of my complete apparatus; and Fig. 2 is a similar section of a modified form of my improved apparatus, in which only one mixing-vessel is used.

A is a closed acid-tank provided with the funnel $a$ and cock $a'$, through which it may be charged with acid, and also provided with the pipe $a^2$, through which air may be forced into said tank to create a pressure therein as a means of forcing the acid therefrom into the mixing-vessel B, with which it communicates through the pipe $a^3$, which extends nearly to the bottom of the vessel B, and is provided with the cock $a^4$, by means of which the flow of acid to the vessel B may be regulated or stopped altogether.

The mixing-vessel B is a close vessel, and is provided, in addition to the pipe $a$, with the glycerine-pipe $b$ and the air-pipe $c$, each extending nearly to the bottom of said vessel in close proximity to the lower end of the pipe $a^3$. Through the pipe $c$ a current of air is discharged into the vessel B as a means of agitating the contents of said vessel and causing a thorough mixing of the same.

If preferred, a mechanical agitator may be introduced into the vessel B in place of the air-pipe $c$, said vessel being so constructed and the pipes $a^3$ and $b$ so arranged therein as to make room therein for said mechanical agitator, which may be a rotating shaft provided with radial arms.

C is a glycerine-tank, preferably made air-tight, and provided with a funnel, $b'$, and cock $b^2$, through which it may be charged with glycerine, and also provided with the pipe $b^3$, through which air may be forced into said tank by any suitable air pump or compressor (not shown) as a means of forcing the glycerine through the pipe $b$ into the mixing-vessel to keep up a steady and continuous supply whenever desired, the supply being controlled by the cock $b^4$ in the pipe $b$.

From the top of the mixing-vessel B the pipe $d$ leads to the interior of a second mixing-vessel, B', said pipe extending nearly to the bottom thereof and serving as a means of communication between the vessels B and B'. The vessel B' is considerably larger than the vessel B—say from two to three times as large—and is connected by the pipe $e$ with the acid-tank A', raised above the vessel B', as shown.

Both of the acid-tanks, A and A', may be open tanks and elevated above the mixing-vessels, as shown at A'; but I prefer to make them closed tanks, as shown at A, and apply pressure thereto to force the contents therefrom, in which case they may be located at any convenient level without regard to the location of the mixing-vessels.

The upper end of the vessel B' has inserted therein a large pipe, G, through which the fumes may escape into the open air or pass to a Glover tower for absorption of nitrous vapors, if any there be.

The pipe e is also provided with a cock, e', by which the flow of acid to the vessel B' may be regulated or stopped altogether.

C' is the separating tank or vessel, covered and provided at its bottom with the funnel C² and connected by the pipe f with the interior of the vessel B', said pipe opening from the vessel B' near its top, passing through the side of the separator C', and extending downward into the funnel C², and having its end bent in such a manner that it discharges in an upward direction within said funnel.

D is the nitro-glycerine receiving-tank, into which the nitro-glycerine is discharged from the vessel C' through the pipe g, which opens from said vessel C' at a point in its side near its upper end, and extends nearly to the bottom of the tank D, which is also provided with a discharge-pipe, h, and cock h', as shown.

E is another tank, designed to receive the spent acid, which is discharged from the lowest portion of the vessel C' through the pipe i, leading to the vessel E, which is also provided with the discharge-pipe j and cock j', by means of which the contents of the vessel E may be drawn off at will.

The operation of my improved process and apparatus, when using the two mixing-vessels, is as follows: The tanks A and A' being charged with a mixture of nitric and sulphuric acids, the cock a⁴ is opened to permit a quantity of the contents of the tank A to pass through tube a³ and descend into the vessel B, where it meets a stream of glycerine discharged into the vessel B through the pipe b from the tank C, and also a jet of air discharged from the pipe c, when reaction takes place and heat is evolved, which is controlled by previously cooling the acid and by discharging jets of cold water upon the exterior of the vessel B through the pipe H. If necessary, a coil of pipe may be placed inside the vessel B, through which a current of cold water may be forced. The amount of cooling required will depend upon the rapidity with which the materials pass through and the proportion of acid to glycerine, but must be sufficient to control the heat evolved. The vessel B is kept always full, but the proportion of acid to glycerine is such that only partial conversion takes place in the vessel B, the contents of which pass through the pipe d to the vessel B', being discharged therein at its bottom, where the partially-converted material meets and mixes with another supply of acid, which descends from the tank A' through the pipe e in sufficient quantity to complete the conversion into nitroglycerine, the reaction which takes place in said vessel B' being sufficient to complete the conversion because of the full supply of acid and the greater capacity of the vessel B', which gives a longer time for action. From the mixing-vessel B' the liquid mixture flows over into the vessel C through the pipe f, and is discharged within the funnel C², where the separation of the nitro-glycerine from the spent acid takes place, the former, which is lighter, rising to the surface of the latter. As the difference in specific gravity is not great and the liquids are rather thick, separation is not extremely rapid; so the vessel C' must be large. From an opening in the side of the vessel C' the nitro-glycerine escapes into the receiver D, and from thence runs off to the washing-tub. (Not shown in the drawings.) From the bottom of the vessel C' the spent acid flows through the pipe i into the receiver E, the exit from which is controlled by the stop-cock j'.

The funnel C² in the separator is used in order that the mixture from the vessel B' may be carried nearly to the bottom of the separator without its flow being affected by the current of spent acid passing off to E through the pipe i.

The two small receivers D and E are important elements in this apparatus, as they stand near together, so that the operator can see the level of the liquids in them, and is thereby enabled to determine the respective heights of the nitro-glycerine and the spent acid in the separator and what adjustment of the action, if any, is required.

The necessary adjustment of the action is obtained by the use of the stop-cock j', as follows: He sets the stop-cock so that the waste acid and the nitro-glycerine both flow from their respective receivers through the proper discharge-orifice at the same time. If any variation in the action occurs affecting the rate of passage he checks or increases the flow of waste acid, which of course is much larger than that of the nitro-glycerine, as the volume of the former is much greater than the latter, thus governing the level in the separator.

The separator is a large covered vessel; but the levels of the liquids in the small receivers D and E correctly indicate the levels of the nitro-glycerine and spent acids, respectively, within the separator C'.

Another important advantage of the use of the receivers D and E is that if the separation of the nitro-glycerine should be unusually slow in proportion to the supply, due to a low temperature, greater viscosity, or other cause, so that the contents of the vessel C' should rise to the pipe g and begin to flow through it into the receiver D before the separation is complete or while the upper portion of said contents is partly acid, the operator can give more time for separation by drawing down the level of the contents of the separator C' considerably or by keeping it below the upper opening leading to the receiver D. Then after a sufficient time has elapsed he checks the flow from the receiver E a little, when the level in the separator C' rises until nitro-glycerine flows into the receiver D and the amount of clear nitro-glycerine on the surface is taken off, when the level of the contents of the separator C' may be dropped again.

There is an immense advantage in being able, as above described, to adjust and change the action without interfering with the continuity of action of the apparatus, and it is certainly desirable that such a reaction as takes place in the production of nitro-glycerine should be completely under the control of the operator.

The supply of acid or glycerine to the vessels B or B' may be checked or stopped altogether, if desired or necessary, for a longer or shorter time by means of suitable stop-cocks, as indicated at $a^4$, $e'$, and $b^4$. Thus on stopping work for some time it would be best to first stop the flow of glycerine to the vessel B, letting acid run until the mixing-vessels B and B' are free from nitro-glycerine.

To remove all nitro-glycerine from the separator, waste acid could be forced into the separator C', or there could be another and lower nitro-glycerine-discharge pipe from the separator C' than that shown in the drawings.

The vessels of this apparatus may be made of iron or lead, and more than two reaction-vessels may perhaps be used to advantage, depending upon the size of the apparatus and the speed at which it is to be run. If more than two such vessels are used, the additional ones should be like the vessel B; but I think that for most cases two will be enough.

There are several important advantages obtained by my system of dividing the operation of conversion into two vessels, among which are, first, division of the heat between two vessels, thus making cooling easier; second, better mixture of the materials; third, partial conversion takes place in first vessel, and conversion is completed in second vessel, where fresh, strong acid is applied to the imperfectly-converted product; and, fourth, ability to use two kinds of acid, which I consider very important, as it is better to use an acid for the first action different from that sent into the second vessel.

The first action occurs more readily, and is or can be accomplished with weaker acid, while the strongest is required for the completion. The first acid may contain more nitric in proportion to the sulphuric, and the second less.

The relative proportions of nitric and sulphuric acids used in the two mixing-vessels B and B' will vary with different circumstances and with different operators, and will be principally dependent upon two things, viz: first, the quality—i. e., strength and purity—of the acids, and, second, the rate of operating; and hence I do not wish to be limited to any specific proportions of acids for the two vessels B and B'; but I will state that under favorable circumstances the proportion of nitric to sulphuric acid which I prefer is three of nitric to five of sulphuric in the first mixing-vessel and two of nitric to five of sulphuric in the second mixing-vessel, the total amount of mixed acids being in the proportion of one of nitric to two of sulphuric.

The foregoing description of the operation refers to an apparatus provided with two mixing-vessels and two acid-tanks; but a very good result in the line of continuous production may be obtained by the use of only one mixing-vessel and one acid-tank, the apparatus being in all respects as shown in Fig. 2 of the drawings; and hence I do not wish to be limited to the use of two mixing-vessels and two acid-tanks, but wish to cover my process and apparatus for continuously producing nitro-glycerine, whether by the aid of one or two mixing-vessels and corresponding acid-tanks. Again, the separating-vessel C' may be dispensed with, and the mixture may be run from the mixing-vessel into a vessel containing water to separate them, as is now the custom, and still give a continuous operation.

What I claim as new, and desire to secure by Letters Patent of the United States, is—

1. The process of producing nitro-glycerine by mixing glycerine with a portion only of the acid required for its conversion into nitro-glycerine, allowing reaction to take place with the aid of agitation by air or otherwise, passing the partially-converted mixture into another and larger vessel, and adding the necessary additional quantity of acid to complete the conversion, substantially as described.

2. The combination of two reaction or mixing vessels of different sizes connected by a pipe, two acid-tanks, each connected by a pipe to one of said mixing-vessels, and a glycerine-tank connected by a suitable pipe to one of said mixing-vessels, substantially as described.

3. The combination of two acid-tanks, two reaction or mixing vessels of different capacities, connected together and to the acid-tanks by suitable pipes, a separating-vessel connected by a pipe with the second or larger mixing-vessel, and means of supplying glycerine to one of said mixing-vessels, all arranged and adapted to operate substantially as and for the purposes described.

4. The combination of the acid-tanks A and A', the reaction or mixing vessels B and B', the separator C', the receivers D and E, arranged at different levels, suitable pipes connecting the several vessels, means of supplying glycerine to the mixing-vessel A, and means of controlling the flow of spent acid from the receiver E, all arranged and adapted to operate to produce a continuous operation, substantially as described.

Executed at Newport, Rhode Island, this 20th day of May, A. D. 1881.

WALTER N. HILL.

Witnesses:
DARIUS BAKER,
JOHN MCDONNELL.